(No Model.)
C. W. BOMAN.
PENHOLDER.
No. 510,322.
Patented Dec. 5, 1893.
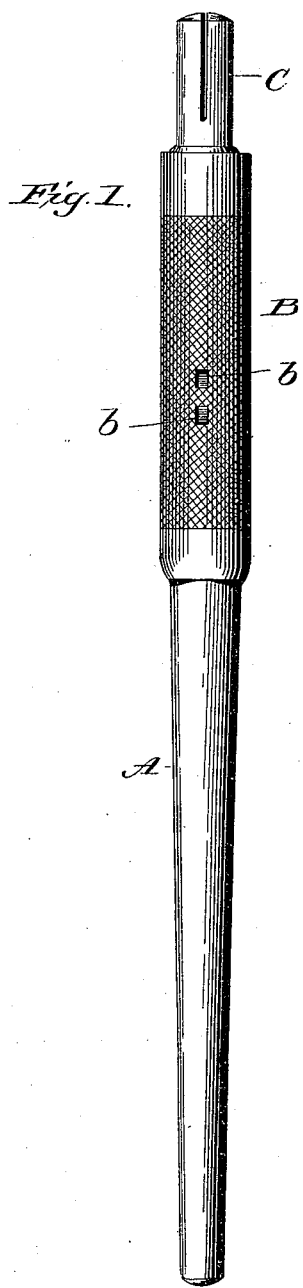
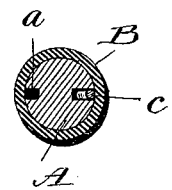
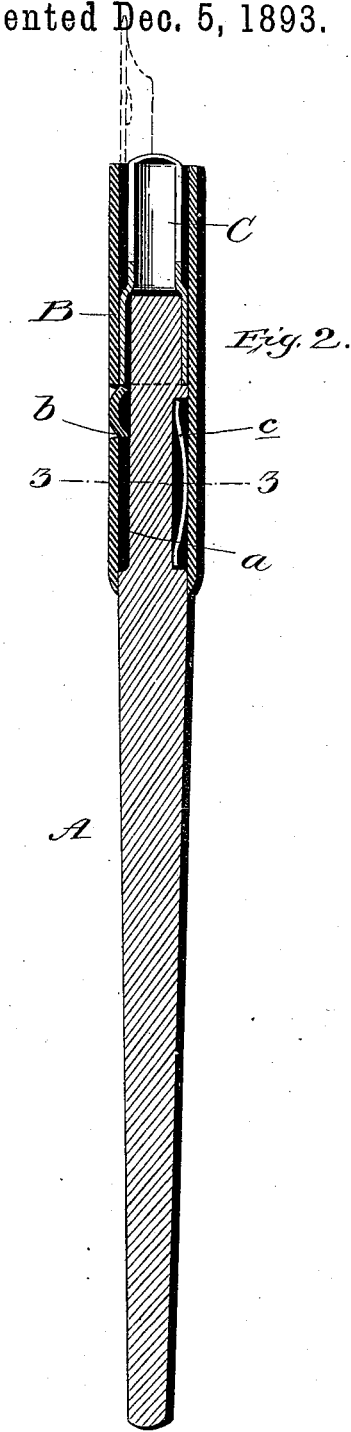

UNITED STATES PATENT OFFICE.

CLAES W. BOMAN, OF NEW YORK, N. Y., ASSIGNOR TO THE EAGLE PENCIL COMPANY, OF SAME PLACE.

PENHOLDER.

SPECIFICATION forming part of Letters Patent No. 510,322, dated December 5, 1893.

Application filed October 20, 1893. Serial No. 488,701. (No model.)

*To all whom it may concern:*

Be it known that I, CLAES W. BOMAN, of the city, county, and State of New York, have invented a new and useful Improvement in Penholders, of which the following is a specification.

My invention relates to that kind of penholder in which the stem or handle is combined with a sleeve between which and the stem the pen is inserted, the sleeve being movable lengthwise upon the stem for the purpose of ejecting or discharging the pen whenever desired.

The invention consists in an improved construction of parts whereby the sleeve and stem are secured together without the use of the pin and slot connection ordinarily employed for the purpose. To this end I form in that part of the stem onto which the sleeve is fitted a longitudinal groove; I provide the sleeve with an internal tongue or projection to enter said groove; and, after the sleeve has been fitted on the stem with its tongue in the groove in the stem, I close the front end of the groove so as to prevent the after-withdrawal of the tongue from it, in this way securing the parts together while at the same time permitting a certain sliding movement of the one relatively to the other, the extent of this movement being limited by the bringing up of the tongue against one or the other of the closed ends of the groove.

In order to guard against possibility of the tongue getting out of the shallow groove in which it lies by a twisting or turning of the sleeve, I provide an elastic or yielding friction pad on the side of the stem opposite that on which the groove is, the action of which is to take up all looseness in fit between the stem and the sleeve and to assure the retention of the tongue in the groove.

In the accompanying drawings to which I shall now refer for a more detailed explanation of my invention, Figure 1 is a side elevation, and Fig. 2 is an axial section of the complete penholder. Fig. 3 is a section on line 3—3, Fig. 1.

A is the stem or handle.

B is the sleeve; and C is the usual sheet metal split tip.

The stem has in its front portion and for a portion of its length the longitudinal groove $a$ which is open at its front end at the time the sleeve is fitted on the stem. The sleeve has an internal projection or tongue $b$ to enter the groove $a$. This tongue may be provided in any suitable way; in the present instance it is formed by slitting the sleeve and then pressing inward the portion thus slit so that it shall project into the interior of the sleeve.

The sleeve B is fitted on the stem, the open end of the groove $a$, permitting the entrance of the tongue $b$; and then the front end of the groove is closed, in this way securing the parts together and preventing the after removal of the sleeve. I prefer to close the front end of the groove by the tip C which is fitted and secured upon the end of the stem after the sleeve has been applied.

The elastic or yielding friction pad hereinbefore referred to, is formed in this instance by a metallic spring strip or wire $c$, which is placed in a slot in the side of the stem diametrically opposite the groove $a$, and is bowed or bent so that its middle will bulge or project slightly beyond the exterior of the stem. This device bears against the interior of the sleeve and as hereinbefore stated takes up any looseness in fit between the stem and the sleeve, and assures the continued engagement of the tongue with the groove.

Having described my invention, what I claim, and desire to secure by Letters Patent, is—

1. A pen holder comprising the grooved stem or handle, the sleeve provided with a tongue to enter the groove, and the tip secured to the stem and closing the front end of the groove therein, substantially as hereinbefore set forth.

2. A penholder comprising the grooved stem or handle, the sleeve provided with a tongue to enter the groove, the tip secured to the stem and closing the front end of the groove therein and the elastic or yielding friction pad interposed between the stem and the sleeve, substantially as hereinbefore set forth.

In testimony whereof I have hereunto set my hand, before two subscribing witnesses, this 18th day of October, 1893.

CLAES W. BOMAN.

Witnesses:
SAMUEL KRAUS,
P. H. BUCKMASTER.